G. W. JOHANSSON & J. V. M. RISBERG.
GEARING FOR CENTRIFUGAL MACHINES.
APPLICATION FILED SEPT. 28, 1911.
1,156,233.
Patented Oct. 12, 1915.
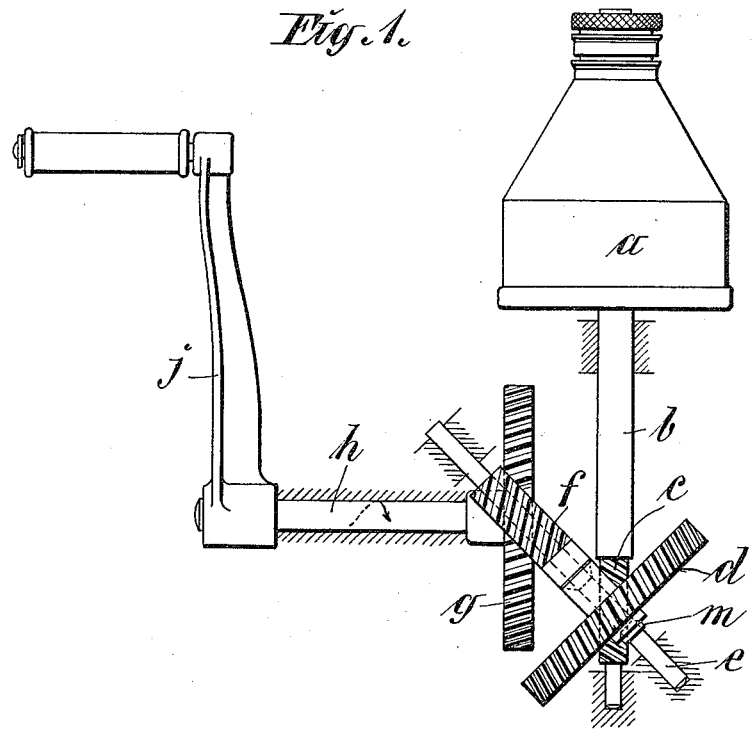
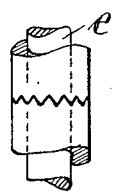
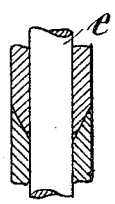
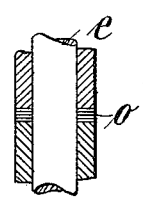
WITNESSES
INVENTORS
GUSTAF WILHELM JOHANSSON
AND
JOHANNES VALDEMAR MÄRTEN RISBERG
By
Attorney

UNITED STATES PATENT OFFICE.

GUSTAF WILHELM JOHANSSON AND JOHANNES VALDEMAR MÅRTEN RISBERG, OF SÖDERTELJE, SWEDEN, ASSIGNORS TO AKTIEBOLAGET BALTIC, OF SÖDERTELJE, SWEDEN, A CORPORATION OF SWEDEN.

GEARING FOR CENTRIFUGAL MACHINES.

1,156,233. Specification of Letters Patent. Patented Oct. 12, 1915.

Application filed September 28, 1911. Serial No. 651,785.

*To all whom it may concern:*

Be it known that we, GUSTAF WILHELM JOHANSSON, a subject of the King of Sweden, and resident of Östra Badhusgatan 3, Södertelje, in the Kingdom of Sweden, and JOHANNES VALDEMAR MÅRTEN RISBERG, a subject of the King of Sweden, and resident of Villa Fridhem, Södertelje, in the Kingdom of Sweden, have invented certain new and useful Improvements in Gearing for Centrifugal Machines, of which the following is a specification, reference being had therein to the accompanying drawings.

This invention relates to a clutch for such gearings of centrifugal liquid separators and the like as are provided with an auxiliary shaft and a clutch located on the same which is brought into operation and out of operation respectively by the pressure exerted, during the running of the separator, by the driving wheel on the pinion (or gear wheel) located on the auxiliary shaft and slidable on the same for this purpose. According to this invention the other gear wheel located on the auxiliary shaft forms directly the other part of the clutch, so that the power need not be transmitted from the pinion to the said wheel by the auxiliary shaft. Consequently, the said shaft is not subjected to any torsion, and for this reason it can be made more slender and lighter than hitherto. A characteristic feature of the invention lies also in the fact that the said gear wheel runs loosely on the auxiliary shaft but is brought into engagement with it by the pressure exerted by the pinion, so that during the running of the separator the pinion and the gear wheel run as on a pivot, whereby the running becomes easier.

A clutch arranged in accordance with this invention is shown diagrammatically in the accompanying drawing, in Figure 1 in a side elevation. Figs. 2 to 4 inclusive show different forms of the clutch.

*a* is a centrifugal drum and *b* is its spindle. The lower end *c* of the said spindle is screw threaded, as usual. The screw threads mesh with a toothed wheel *d* provided on an auxiliary shaft *e*. On one end of the said shaft *e* a pinion *f* is loosely mounted, which pinion meshes with a toothed driving wheel *g* which can be rotated by means of a shaft *h* and a crank *j*. In the end of the hub of the toothed wheel *d* facing the pinion *f* a conical recess is provided, into which extends a conical part of the pinion *f*, see also Fig. 2. By this arrangement the pinion *f* can be connected directly with the wheel *d*, so that the auxiliary shaft *e* need not serve as any intervenient part and, consequently, it will not be subjected to any torsion. Owing to the said fact the auxiliary shaft can be made thinner than hitherto, and the construction of the clutch becomes simpler.

The angle between the driving shaft *h* and the shaft *e* is so adapted (about 45 degrees) that, as the driving shaft *h* is rotated by means of the crank *j* in the direction indicated by the arrow, the pinion *f* is forced by one of the components of the pressure between the teeth of the driving wheel *g* and the screw threads of the pinion against the wheel *d*, the conical surfaces being thus forced one against the other and the motion transmitted to the spindle *b* and the drum *a*. If the crank *j* is now released, so that the driving wheel *g* comes to a standstill, the drum *a* continues in its rotary motion owing to its inertia and causes, by means of the spindle *b* and the wheel *d*, the auxiliary shaft *e* to rotate. The pinion is now acted upon by two powers: the auxiliary shaft *e* tends to rotate the pinion owing to the friction between the same and the pinion, and on the other hand the pinion is subjected to a braking action effected by the stationary driving wheel *g*, with the result that the pinion *f* traveling with its screw threads on the teeth of the driving wheel is raised and moved from the wheel *d*.

The wheel *d* may bear freely against a shoulder *m* on the shaft so arranged, that the wheel *d* is forced by the pinion *f* against the same, so that the pinion *f*, the wheel *d* and the shaft *e* are connected and rotate simultaneously. Owing to this arrangement the pinion and the wheel *d* can be rotated more easily than would be the case if the shaft *e* is stationary. Owing to the said arrangement the mounting of the parts is simplified. In order to increase the friction between the parts the said shoulder may have a conical bearing surface coöperating with a correspondingly shaped surface on the wheel.

The conical bearing surfaces between the pinion f and the hub of the wheel d may be replaced by suitably fluted or rough surfaces, Fig. 3, or by an interposed piece o of a suitable friction substance, Fig. 4, located between the flat end surfaces of the said hub and the pinion.

Having now described our invention, what we claim as new and desire to secure by Letters Patent is:

1. In a gearing for centrifugal liquid separators and the like, the combination of an auxiliary shaft, a pinion adapted to slide on the shaft, a driving wheel engaging the pinion, the axis of the pinion forming an angle of about 45 degrees with the axis of the driving wheel, a coupling member fixed on the pinion, a wheel on the auxiliary shaft, said wheel constituting a coupling member coöperating with the first mentioned coupling member, a drum and gearing connections between the same and the wheel on the auxiliary shaft, substantially as described and for the purpose set forth.

2. In a gearing for centrifugal liquid separators and the like, the combination of an auxiliary shaft, a pinion adapted to slide on the shaft, a driving wheel engaging the pinion, the axis of the pinion forming an angle of about 45 degrees with the axis of the driving wheel, a coupling member fixed on the pinion, a wheel loosely mounted on the auxiliary shaft, said wheel constituting a coupling member coöperating with the coupling member first mentioned, a shoulder on the auxiliary shaft on the opposite side of the wheel last mentioned with relation to the pinion, a drum, and gearing connections between the same and the wheel on the auxiliary shaft, substantially as described and for the purpose set forth.

In witness whereof, we have hereunto signed our names in the presence of two subscribing witnesses.

GUSTAF WILHELM JOHANSSON.
JOHANNES VALDEMAR MÅRTEN RISBERG.

Witnesses:
GRETA PRIEN,
ROBERT APELGREN.

Copies of this patent may be obtained for five cents each, by addressing the "Commissioner of Patents, Washington, D. C."